US008874287B2

(12) United States Patent
Budan et al.

(10) Patent No.: US 8,874,287 B2
(45) Date of Patent: Oct. 28, 2014

(54) TRANSPORTABLE DEVICE FOR RECORDING FLIGHT DATA

(75) Inventors: Jean-Loup Budan, Tousson (FR); François Fournier, Roques sur Garonne (FR); Michel Le Goas, Paris (FR)

(73) Assignee: Thales, Neuilly sur Seine (FR)

( * ) Notice: Subject to any disclaimer, the term of this patent is extended or adjusted under 35 U.S.C. 154(b) by 143 days.

(21) Appl. No.: 13/085,912

(22) Filed: Apr. 13, 2011

(65) Prior Publication Data

US 2012/0095624 A1 Apr. 19, 2012

(30) Foreign Application Priority Data

Apr. 13, 2010 (FR) ..................................... 10 01552

(51) Int. Cl.

*G01C 23/00* (2006.01)
*H01R 13/648* (2006.01)
*G07C 5/08* (2006.01)
*G07C 5/00* (2006.01)

(52) U.S. Cl.

CPC ............ *G07C 5/0858* (2013.01); *G07C 5/0808* (2013.01); *G07C 5/006* (2013.01)
USPC ............................................................ 701/14

(58) Field of Classification Search

CPC .... G01C 23/00; G01C 23/005; H01R 23/688; H01R 13/65807
USPC .......... 701/3, 14, 47; 361/679.55; 439/607.01
See application file for complete search history.

(56) References Cited

U.S. PATENT DOCUMENTS

| | | | | |
|---|---|---|---|---|
| 5,570,270 | A | 10/1996 | Naedel et al. | |
| 5,834,693 | A | 11/1998 | Waddell et al. | |
| 6,401,013 | B1 | 6/2002 | McElreath | |
| 7,755,890 | B2 | 7/2010 | Rui et al. | |
| 2006/0279250 | A1 * | 12/2006 | Keely et al. | 320/103 |
| 2010/0048052 | A1 | 2/2010 | Tien et al. | |

FOREIGN PATENT DOCUMENTS

| | | | |
|---|---|---|---|
| EP | 1 726 918 | A1 | 11/2006 |
| FR | 2 907 758 | A1 | 5/2008 |
| WO | 2009/097554 | A1 | 8/2009 |
| WO | 2010/028350 | A1 | 3/2010 |

* cited by examiner

*Primary Examiner* — Mary Cheung
(74) *Attorney, Agent, or Firm* — Baker & Hostetler LLP

(57) ABSTRACT

A transportable device for recording flight data obtained from an avionics system in an aircraft is provided. The device includes a case containing a laptop computer. The case limits the electromagnetic disturbances between the laptop and the avionics system. The laptop is connected to the avionics system, so as to receive the flight data to be recorded. The device can be applied to monitoring of flight data.

16 Claims, 1 Drawing Sheet

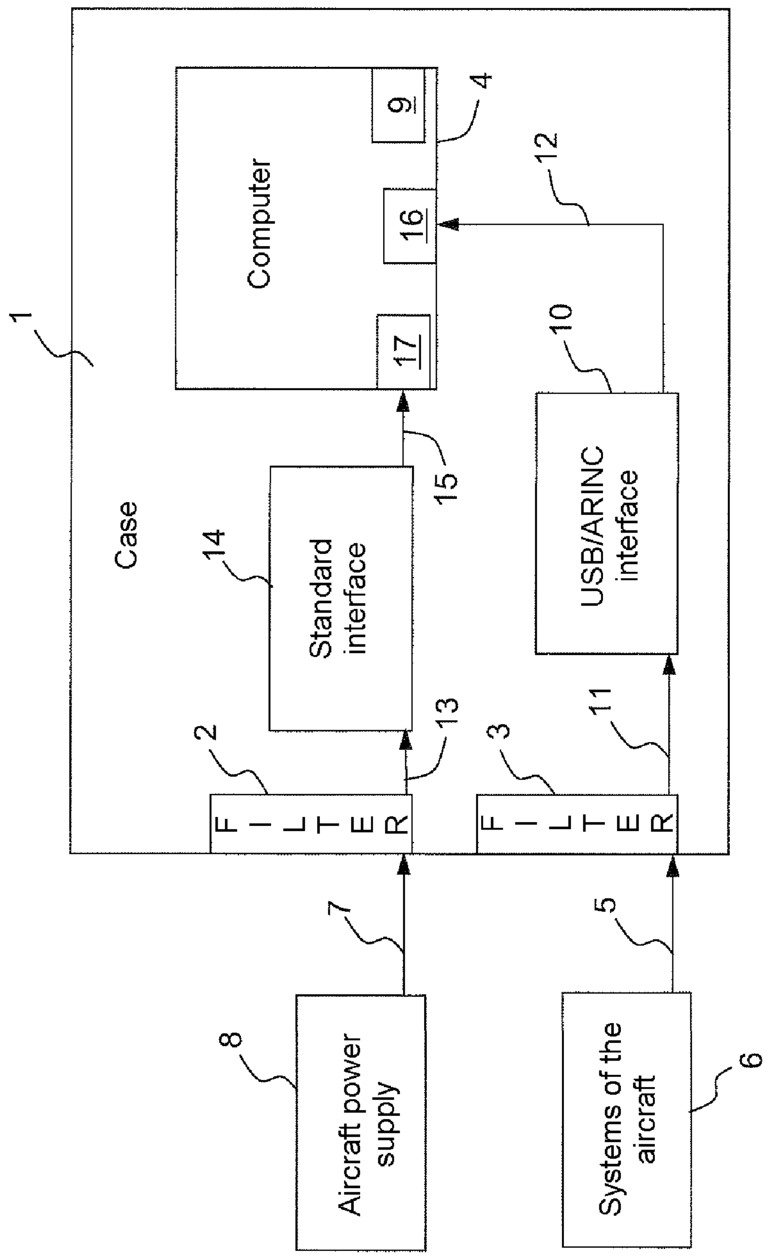
1
Case
Computer
9
4
16
12
17
10
USB/ARINC interface
15
14
Standard interface
13
2
3
11
FILTER
FILTER
7
5
8
Aircraft power supply
Systems of the aircraft
6

TRANSPORTABLE DEVICE FOR RECORDING FLIGHT DATA

CROSS-REFERENCE TO RELATED APPLICATION

This application claims priority to foreign French patent application No. FR 1001552, filed on Apr. 13, 2010, the disclosure of which is incorporated by reference in its entirety.

FIELD OF THE INVENTION

The present invention relates to the field of the monitoring of flight data. It applies notably to the onboard systems in aircraft which fulfil various functions useful to the accomplishment of a flight, such as fuel management, calculation of the position of the aircraft and its centre of gravity, or even calculation of its weight.

BACKGROUND

An issue common to these onboard systems is that they should make it possible to collect the information necessary for maintenance, for the management of alarms and for various technical investigations.

In the new generation aircraft, these systems communicate with onboard data concentrators and/or centralized maintenance computers, usually situated in the avionics rack, making it possible to collect, centralize, analyse, summarize, archive and transmit the necessary information to the operators or engineers.

However, in the previous generation aircraft, there is no data concentrator, which prevents any in-depth investigation and results in a large number of healthy equipment items being removed, complex and costly maintenance operations and aeroplane delays. In these aeroplanes, the collection of the flight data is made particularly difficult by the lack of space in the avionics rack which is combined with the high sensitivity of the avionics systems to electromagnetic disturbances. In practise, the aim is to snoop on the avionics systems without disturbing their operation. This is why, in the previous generation aeroplanes, the data are collected only on the ground when the aircraft is no longer in operational service. Unfortunately, the data collected are generally very inadequate and do not make it possible to explain anomalies associated with the operational and/or environmental context of the aircraft.

SUMMARY OF THE INVENTION

The invention notably overcomes the combined challenges of lack of space and electromagnetic sensitivity, by using a laptop computer protected in a shielded case, so that, in flight, the case can be placed in the cockpit, the laptop then being powered directly by the aeroplane and recovering the flight data. On the ground, the laptop makes it possible to restore the data and to simulate their inputs to replay what was recorded in flight. To this end, the subject of the invention is a device for recording flight data obtained from an avionics system in an aircraft. It comprises a case containing a laptop computer, the case limiting the electromagnetic disturbances between the laptop and the avionics system and the laptop being connected or connectable to the avionics system so as to receive the flight data to be recorded.

Advantageously, the case may have dimensions suitable for being arranged in the cockpit of the aircraft or in the hold of the aircraft.

For example, the case may be metallic.

In one embodiment, the device may include connectors arranged on at least one of the walls of the case, the connectors being able to make it possible to link a standard wiring arranged inside the case to a wiring conforming to aeronautical standards arranged outside the case.

Advantageously, the connectors may include filters.

Advantageously, the wiring outside the case may conform to the aeronautical standards concerning connection systems and insulation against electromagnetic waves.

Advantageously, a first connector may be suitable for receiving a power supply voltage.

In one embodiment, the wiring inside the case may comprise a first adapter lead linking the first connector to a power supply interface and a power supply lead linking the power supply interface to a power supply connector of the laptop.

In one embodiment, a second connector may be suitable for receiving the flight data obtained from the onboard avionics system in the aircraft.

In one embodiment, the wiring inside the case may comprise a second adapter lead linking the second connector to an interface between a PC standard and an aeronautical standard, a lead conforming to the PC standard linking said interface to a connector of the laptop conforming to the PC standard.

For example, the PC standard may be USB and the aeronautical standard may be ARINC.

In one embodiment, the wiring outside the case may comprise a first connecting lead suitable for linking the first connector to a power supply device of the aircraft.

In one embodiment, the wiring outside the case may comprise a second connecting lead suitable for linking the second connector to the avionics system, so as to transfer, during the flight, the flight data obtained from the avionics system to the laptop.

Advantageously, the second connecting lead may not make it possible to transfer data from the computer to the avionics system.

Advantageously, the laptop may include, to record the flight data, storage means insensitive to shocks and vibrations.

For example, the storage means may include an SD card or an SDD or an RHD.

In one embodiment, the laptop may include applications for communicating flight data, and/or for collecting flight data and/or for processing flight data, and/or for analysing flight data, and/or for summarizing flight data, and/or for archiving flight data, and/or for graphically representing flight data, and/or for managing the flight database.

The present invention also has the main advantage that, by using a single transportable device both in flight to recover the data and on the ground to replay the data, that is to say by not using any data link between the aeroplane and the ground, the invention facilitates the transfer of all the data from the aircraft to the ground and therefore makes it possible to easily replay the most complex scenarios.

BRIEF DESCRIPTION OF THE DRAWING

Other features and advantages of the invention will become apparent from the following description given in light of FIG. 1 which illustrates, by a diagram, the principles of the invention.

DETAILED DESCRIPTION

FIG. 1 is a diagram illustrating the principles of the invention. A standard laptop computer 4 (or any similar computing device) is arranged in a case 1 which, when it is closed, is compatible with the aeronautical standards concerning insulation against electromagnetic waves. For example, the case 1 may be metallic, made of aluminium notably in order to reduce its weight. With its small dimensions and low weight, the case 1 can easily be placed in the cockpit of an aircraft. However, it could also be placed in the hold. Connectors 2 and 3 are arranged on one of the internal walls of the case 1. They may notably include filters conforming to the aeronautical standards, for example the standard DO160A. The connectors 2 and 3 make it possible to link a standard wiring arranged inside the case to a wiring conforming to the aeronautical standards arranged outside the case 1, notably the aeronautical standards concerning connection systems and insulation against electromagnetic waves. The various leads forming these wiring systems are described hereinbelow. The connector 2 is suitable for receiving, via a connecting lead 7 conforming to the aeronautical standards, a power supply voltage supplied by a power supply device 8 of the aircraft. The connector 3 is suitable for receiving, via a connecting lead 5 conforming to the aeronautical standards, flight data supplied by onboard avionics systems 6 in the aircraft. In the case 1, a standard curved adapter lead 11 may link the connector 3 to a standard PC interface 10 of USB/ARINC (Universal Serial Bus/Aeronautical Radio INCorporated) type for example. However, it could also be any interface between a PC standard and an aeronautical standard. A standard USB lead 12 may link the PC interface 10 to a USB connector 16 of the computer 4. In the case 1, a standard adapter lead 13 may link the connector 2 to a standard power supply interface 14. A standard power supply lead 15 may link the power supply interface 14 to a power supply connector 17 of the computer 4. Attachment systems, for example of Velcro (registered trade mark) type, may advantageously be used to secure the PC interface 10 and the power supply interface 14 at the bottom of the case 1. Other attachment systems, for example plastic collars, may advantageously be used to secure, in the case 1, the various leads. Arranged under the case 1, an attachment system and associated cables may make it possible to ground the case 1.

In order to increase the compactness of the device and therefore limit its dimensions, all of the connectors 2 and 3, the leads 11, 12, 13 and 15 and the interfaces 10 and 14 described previously may be arranged at the bottom of the case 1, topped by a flat metallic support not represented in FIG. 1, the flat support separating the interior space of the case 1 into two spaces and the laptop 1 then being able to be secured on top of the support. Preferably, the computer 4 may be secured to the flat support by virtue of adhesive attachments not represented in FIG. 1 previously arranged under the computer 4. Advantageously mounted on silent blocks, the flat support limits the vibrations transmitted to the computer 4.

During the flight, the connecting lead 5 makes it possible to transfer flight data from the onboard system 6 to the laptop 4 via the connector 3, the lead 11, the PC interface 10 and the connector 12. During the flight, the connecting lead 5 cannot be used to transfer data from the computer 4 to the onboard system 6. On the ground, other connecting leads, not represented in FIG. 1, may be used in place of the connecting lead 5 to transfer the flight data from the computer 4 to various ground systems which are not represented in FIG. 1. These other leads may be left available in the case 1, unconnected to the laptop 4. However, on the ground, other means of transferring data to the ground systems may be used, such as a USB key, a 3G link, a WIFI link or even a Bluetooth link, provided that these transfer means are deactivated during the flight.

In a preferred embodiment, the laptop 4 may include a standard Secure Digital (SD) card 9 to back up the data during the flight and thus avoid the use of the hard disk of the computer 4, which is not robust to shocks and vibrations unlike the SD card 9. However, any other storage medium insensitive to shocks and vibrations could be used instead of the SD card 9, for example a "Solid State Drive" (SSD) or a "Rugged Hard Drive" (RHD) to limit the risks associated with vibrations.

Advantageously, various software packages suited to the necessary investigations may be installed on the computer 4: communication, collection, processing, analysis, summary, archiving, graphic representation, database management applications or even links with the guides and manuals.

The invention described previously also has the main advantage that it proposes an inexpensive solution that uses standard elements available on the market. Moreover, it offers a recording system that is robust to shocks and vibrations, which are omnipresent in aircraft. Another advantage of a device according to the invention is that it adapts very easily to the electrical power supply specifics of all aircraft.

The invention claimed is:

1. A transportable device for recording flight data obtained from at least one avionics system in an aircraft, comprising:

a case containing a laptop computer, the case being configured to limit the electromagnetic disturbances between the laptop computer and the avionics system when the case is closed, the laptop computer being connectable to the avionics system so as to receive the flight data to be recorded, and the device further comprising a connection lead configured to allow transfer of the flight data obtained from said at least one avionics system to the laptop computer while preventing data transfer from the laptop computer to the avionics system during a flight.

2. The device according to claim 1, wherein the case has dimensions suitable for being arranged in the cockpit of the aircraft or in the hold of the aircraft.

3. The device according to claim 1, wherein the case is metallic.

4. The device according to claim 1, further comprising connectors arranged on at least one of the walls of the case, said connectors making it possible to link a standard wiring arranged inside the case to a wiring conforming to aeronautical standards arranged outside the case.

5. The device according to claim 4, wherein the connectors include filters.

6. The device according to claim 4, wherein the wiring outside the case conforms to the aeronautical standards regarding connection systems and insulation against electromagnetic waves.

7. The device according to claim 4, wherein a first connector is suitable for receiving a power supply voltage.

8. The device according to claim 7, wherein the wiring inside the case comprises a first adapter lead linking the first connector to a power supply interface and a power supply lead linking the power supply interface to a power supply connector of the laptop computer.

9. The device according to claim 8, wherein the wiring inside the case further comprises a second adapter lead linking the second connector to an interface between a PC standard and an aeronautical standard, a lead conforming to the PC standard linking said interface to a connector of the laptop computer conforming to the PC standard.

10. The device according to claim 9, wherein the PC standard is USB and the aeronautical standard is ARINC.

11. The device according to claim 7, wherein the wiring outside the case comprises a first connecting lead suitable for linking the first connector to a power supply device of the aircraft.

12. The device according to claim 4, wherein a second connector is suitable for receiving the flight data obtained from the onboard avionics system in the aircraft.

13. The device according to claim 1, wherein the laptop computer further comprises, in order to record the flight data, storage means insensitive to shocks and vibrations.

14. The device according to claim 13, wherein the storage means include an SD card or an SDD or an RHD.

15. The device according to claim 1, wherein the laptop computer includes one or more applications for:

communicating flight data;
collecting flight data;
processing flight data;
analysing flight data;
summarizing flight data;
archiving flight data;
graphically representing flight data; or
managing the flight database.

16. The device according to claim 1, wherein the case is configured to contain the laptop computer and further configured to transport the laptop computer to and from an aircraft cockpit.

* * * * *